United States Patent [19]
Omoto

[11] 3,746,433
[45] July 17, 1973

[54] DEVICE FOR MEASUREMENT OF A VISUAL FIELD OF TWO EYES

[76] Inventor: Katsuji Omoto, No. 28-5, 2-chome, Kobinata, Bunkyo-ku, Tokyo, Japan

[22] Filed: Nov. 15, 1971

[21] Appl. No.: 198,842

[30] Foreign Application Priority Data
Nov. 26, 1970 Japan.............................. 45/103683

[52] U.S. Cl........................ 351/24, 351/23, 351/32
[51] Int. Cl............................................ A61b 3/02
[58] Field of Search .................... 351/23, 39, 32, 24

[56] References Cited
UNITED STATES PATENTS
3,188,653  6/1965  Omoto............................ 351/23 X
1,721,208  7/1929  Currier et al..................... 351/23
R17,987    3/1931  Ferree et al...................... 351/23

Primary Examiner—David Schonberg
Assistant Examiner—Paul A. Sacher
Attorney—Laforest S. Saulsbury and William T. Hough

[57] ABSTRACT

Measurement of a visual field of two eyes comprising measuring two eye visual field by means of a spherical surface passing through respective nodal points of two eyes and a point of fixation in a predetermined distance from said nodal points.

3 Claims, 5 Drawing Figures

PATENTED JUL 17 1973          3,746,433

INVENTOR
KATSUJI OMOTO
BY Laforest S. Saulsbury
ATTORNEY

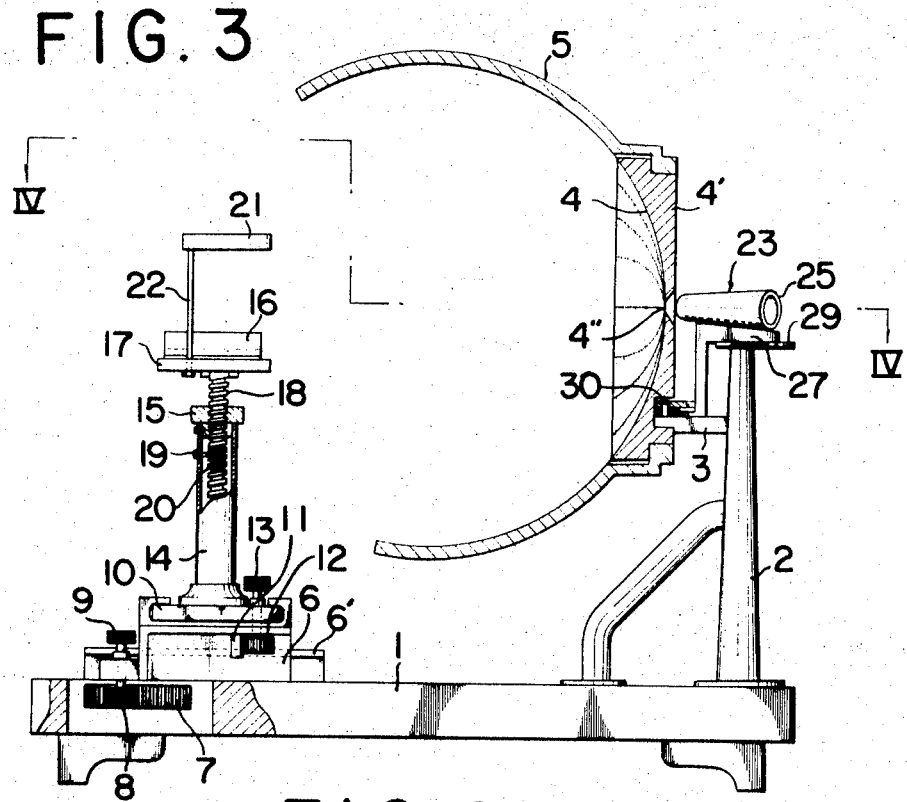
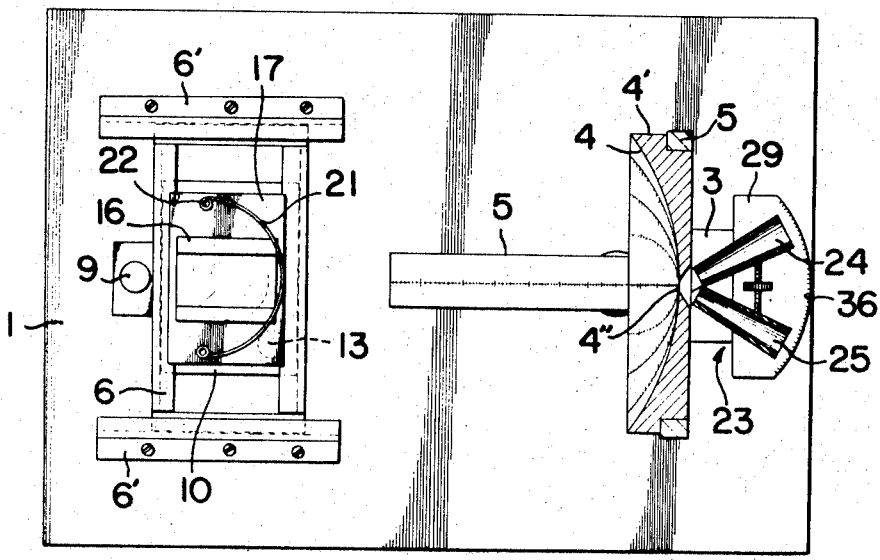

DEVICE FOR MEASUREMENT OF A VISUAL FIELD OF TWO EYES

This invention relates to measurement of a visual field of two eyes.

Generally, eyes of a normal person are two, which combine impressions of stimulation from outside to see with two eyes. It is exceptional that one eye only receives outside stimulation and sees with only one eye. All things in nature are recognized with these two eyes in three dimentions or so called "stereoscopic vision". Although a normal person usually sees with two eyes, the conventional perimeter was a perimeter for one eye vision and it could not measure a field of vision with two eyes. Even when measuring a field of vision with two eyes, a two eye perimeter used a stereoscope as in the Lyoyd type or a plane reflecting mirror as in the Onishi type, by which one eye visual fields are separately measured for left and right eyes and then are combined. Therefore, it was not possible to really obtain a combined visual field of two eyes in a natural condition.

Heretofore, measurement of a field of vision was based on a visual angle, that is, it employed a method of measurement of a visual field by a visual angle, which projected and measured an impression of stimulation from outside on a semispherical or plane surface through visual angle. However, eyeball, as seen clearly from a horizontal anatomical chart thereof, has its retina expanding in the direction of cornea far over the equator of the eyeball. The cornea forms geometrically a major arc in the horizontal cross section of eyeball. Although the formed spherical surface is nearly perfectly spherical except in a ciliary body of the cornea, the measurement of field of vision has been made unnaturally through a visual angle by projecting impression on a semi-spherical surface or a plane. Thus, it was not capable of obtaining a natural visual field of two eyes.

The present applicant proposed in U.S. Pat. No. 3,188,653 a perimeter having a measuring surface similar to a cornea of an eyeball. However, this invention still concerns a one eye perimeter, which can not obtain a natural visual field by two eyes.

The present invention has for its object to provide a method and an apparatus removing the above drawback of the conventional perimeters and obtaining a real two eye visual field.

The invention has accomplished the object by means of a horopter sphere used for a perimeter sphere, which is formed by connecting a point on a perpendicular bisector between central points of two eyeballs and nodal points of two eyes.

The principle and embodiment of the invention will now be described in more detail with reference to the drawings, in which:

FIG. 3 is a side elevation of an embodiment of the apparatus according to the invention.

FIG. 4 is a plan view of the embodiment of FIG. 3.

Figure 1:
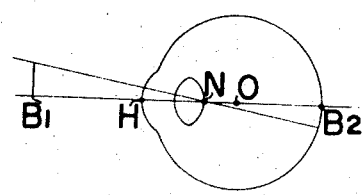
FIG. 1 is a diagram showing a pattern of an eyeball.
Figure 5:
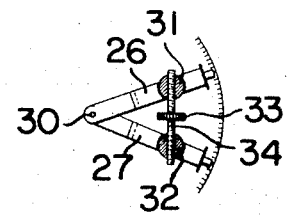
FIG. 5 is a plan view of an adjusting means of an apparatus for fixing a position of eyeballs.

In FIG. 1, $B_1$ denotes a front focus; H a main point; N a nodal point; $B_2$ a rear focus; and O a central point. In consideration of a optical system of an ordinary lens, N corresponds to a center of the lens and $B_1$, $B_2$ to front and rear focuses of the lens. O is a central point about which an eyeball revolves.

Figure 2:
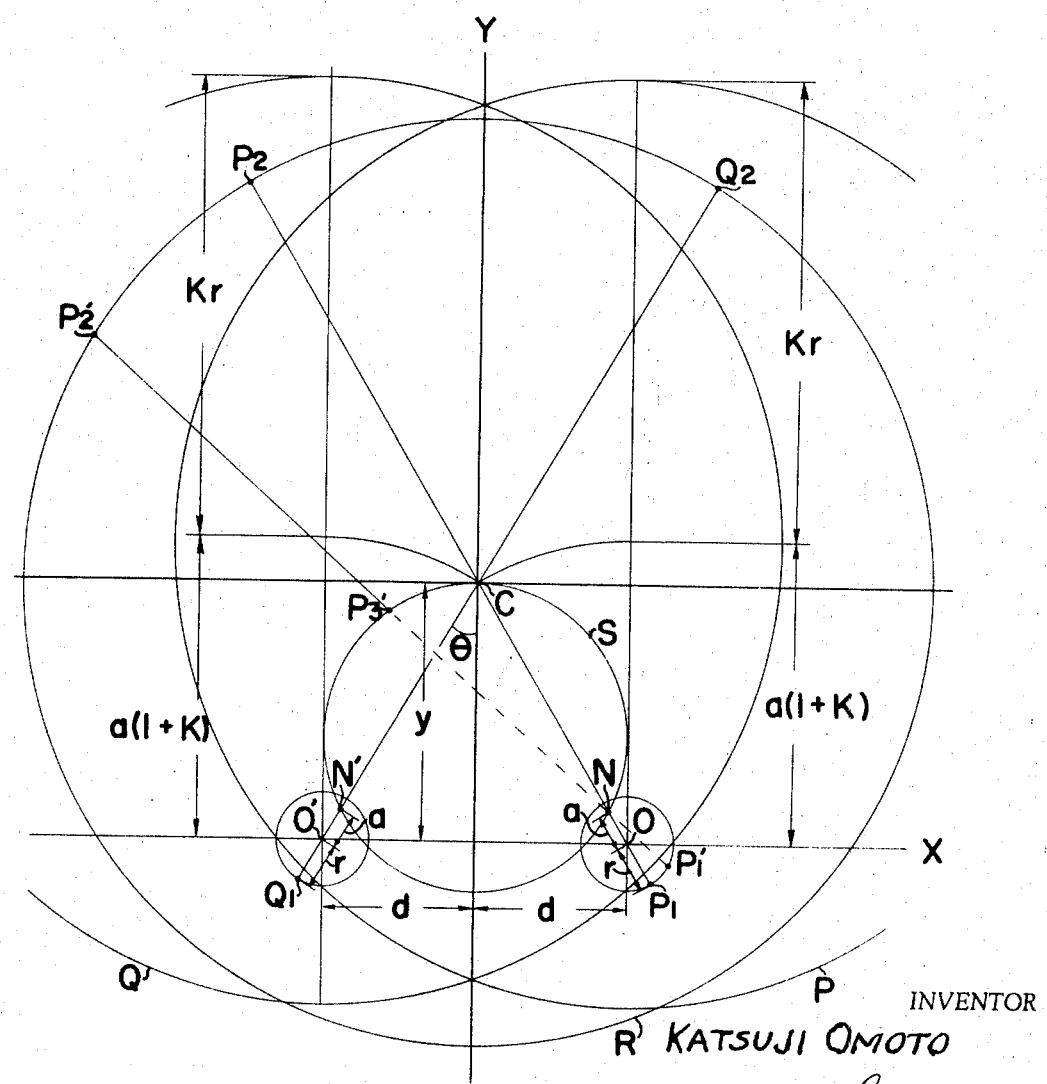
FIG. 2 is a diagram illustrating the principle of the method for measuring two eye visual field according to the present invention.

In FIG. 2, a distance $\overline{OO'}$ between a central point O of the right eye and a central point O' of the left eye s 2d; a line connecting the central points O and O', X-axis; a perpendicular bisector between the central points O and O' on the X-axis, Y-axis; and co-ordinate at any points on the eyeball, x, y. If the left and right eyes are assumed of the same shape, point on the eyeball surfaces of the right and left eyes is shown by the following equation (an eyeball is assumed to have a spherical surface).

Right eye $(x-d)^2 + y^2 = r^2$

Left eye $(x+d)^2 + y^2 = r^2$ where, r is a radius of an eyeball of right and left eyes.

The theory on the perimeter of the above-mentioned Patent is now applied. A ratio of a radius R of a perimeter surface and a radius r of the eyeball is given by K and distances between the central points O and O' of the eyeball and the nodal points N and N' of the two eye respectively are given by a. The equations of a perimeter surface P of the right eye and a perimeter surface Q of the left eye, when the two eyes look at an infinite point, are respectively expressed by the following.

Right eye $(x-d)^2 + [y - (1+K)a]^2 = (Kr)^2$

Left eye $(x+d)^2 + [y - (1+K)a]^2 = (Kr)^2$

When one point is viewed with normal eyes and as human eyes are two in number and each eye sees this one point to make two eye vision, the lines of fixation of two eyes converge to the fixation point. This function of intersection of fixation lines of two eyes is called the convergence. As a unit of convergence, a meter angle is used. One meter angle is an angle made by visual lines of two eyes when the two eyes converge at a point of a distance 1 m. before the eyes. 2 m. angle is an angle made by visual lines of the two eyes when the two eyes converge at a point of a distance ½ m. before the eyes. Thus, in the same meter angle, the real angle increases or decreases in proportion to increase or decrease of the distance between central points.

If an angle of convergence is given by 2 θ when visual lines of the two eyes converge at a point C on the axis Y, a distance of convergence or a distance y from the axis X to the point C is given by the following formula:

$\tan \theta = d/y$ and thus $y = d \cot \theta$, where convergence is made in the y or $d \cot \theta$ meter angle. Then, the real angle is 2 θ. If a position of a point C is determined such that distances from the central points O and O' will become a $(1+K)$, it will appear that the perimeter sphere P of the right eye and the perimeter sphere Q of the left eye will move the central points O or O' to the center as though the centers of the spheres P and Q will agree in the point C. Therefore, the perimeter spheres P and Q agree with the perimeter spheres R having the point C as the center. That is to say, the perimeter sphere of the two eyes coincide with the perimeter sphere R. At this instant, the point $P_2$ corresponding to the central orbit $P_1$ of the right eyeball and the point $Q_2$ corresponding to the central orbit $Q_1$ of the left eyeball will lie on the common perimeter sphere R, i.e., corresponding points of the central orbits will lie separately at two points respectively for the left and right eyes. Therefore, it is necessary for the two eye perimeter sphere that one point on a perimeter sphere is corresponding points of the right and left eyeballs. Corresponding points of the two eyes are respectively image points of the left and right eyes when a point in the outside is projected on the corneas of two eyes and such image points are at equal distances from the central orbits in the same direction from the central orbits of both left and right eyes. The outside image projected on the corresponding points appears is single vision by the two eyes. When the visual lines converge at a near point before the eyes, such point of convergence is seen as single vision by the two eyes and besides points on a predetermined circle passing the point of convergence called as a single visual circle is seen as single vision by the two eyes. In FIG. 2, this single visual circle is shown by a circle S passing through the center C of the similar perimeter sphere R common to the both eyes, the nodal point N of the right eye and a nodal point N' of the left eye. Every point on this circumference of the circle is theoretically projected on the corresponding points of the two eyes and is seen as single vision. If this single visual circle S is rotated about the Y-axis, a sphere is generated. All points on its spherical surface are assumed to correspond to the corneas of the two eyeballs.

Coordinates of this point C and nodal points N, N' are now obtained from the following.

Point C $(O, d \cot \theta)$

Nodal Point N $(d - a \sin \theta, a \cos \theta)$

Nodal Point N' $(-d + a \sin \theta, a \cos \theta)$

The single visual circle S passing these three points is expressed by the following equation.

$$\begin{vmatrix} x^2 + y^2 & & & x & y & 1 \\ d^2 \cot^2 \theta & & & 0 & d \cot \theta & 1 \\ (d-a \sin \theta)^2 + a^2 \cos^2 \theta & & & d-a \sin \theta & a \cos \theta & 1 \\ (-d+a \sin \theta)^2 + a^2 \cos^2 \theta & & & -d+a \sin \theta & a \cos \theta & 1 \end{vmatrix} = 0$$

It became clear that the sphere produced by turning the circle shown by this equation is the single vision perimeter sphere or horopter sphere and this could be used as the two eye perimeter sphere. Since all points on the spherical surface of this horopter sphere are corresponding points of the left and right eyes, the two eye visual field can be measured from the surface of the horopter sphere assumed as a measuring surface.

For the perimeter in use of this horopter sphere, it is required to set up the central points O and O' of the eyes upon inspection at precisely fixed positions. This can be attained as explained in the above mentioned Patent so by to exactly looking at the point C.

For the two eye perimeter, it is required for easiness of the measurement to measure visual fields of the left and right eyes by means of a common scale. For this purpose, in the embodiment of the perimeter of the present invention, a scale is projected and graduated by point of a common similar perimeter sphere on the single vision perimeter sphere S.

For instance, the points $P_2$ and $Q_2$ projected on the central orbits $P_1$ and $Q_1$ are graduated respectively on the point C and a point $P'_2$ projected on a certain corresponding point $P'_1$ is graduated on a point $P'_3$. This is due to the fact that, on the common similar perimeter sphere R, for both left and right eyes scale can be graduated symmetrically and uniformly on left and right sides of the points $P_2$ and $Q_2$ respectively projected on the central orbits $P_1$ and $Q_1$.

In the present embodiment, since the graduation on the common similar perimeter sphere R is projected on the single visual field sphere S, it is the two eye perimeter but of course it can be used as one eye perimeter if it is measured with one eye covered up.

If graduations of the single vision sphere S is projected and measured on a plane surface T contacting the single vision sphere S at a point C, it is possible to produce a two eye campimeter. In this case, also, the two eye perimeter can be used as one eye campimeter if one of the two eyes is covered up.

As mentioned above, conventional perimeters have a single eye visual field, but it became possible to create a two eye perimeter which can measure a two eye visual field naturally through the two eye vision.

In the conventional measurement of two eye visual field, the visual fields of the left and right eyes were simply respectively measured without consideration of a distance between central points of the two eyes and a visual field of the left and right eyes could be measured by superimposing perimeter diagrams of the left and right eyes on each so as to coincide with horizontal and vertical lines passing through fixation points in the diagrams of each eyes. As distinguished from the conventional measurement, in the present invention, by measuring a distance between central points and fixing the eyeball position fixation apparatuses of the above mentioned Patent at predetermined positions, measurement can be made so as to obtain a natural visual field visual fields of the two eyes being fixed with respect to the fixation point.

In the following is illustrated an embodiment of the present invention.

To a frame 1 is attached a support 2 at an upper end of which a support member 3 is provided horizontally. The support member 3 is provided with a scale member 4' on which a graduated surface 4 of a spherical part is formed. The radius of curvature of the graduated surface 4 is the radius of the described horopter sphere S. On the graduated member 4' is rotatably supported a circular auxiliary graduated plate 5 of the same radius of curvature as the graduated surface 4. The locus formed by the circular auxiliary graduated plate 5 and the graduated surface 4 forms a spherical part. The measurement can be made only by the circular graduated surface 4 without use of the circular auxiliary graduated plate 5.

The frame 1 is provided with a base plate 6 which is slidable forwardly and rearwardly relative to the graduated member 4' by guide 6'. The forward and rearward displacement of the base plate 6 is adjusted by the grip 9 having a pinion 8 meshing with a rack 7 fixed on the frame 1.

On the base 6 is supported a support table 10 to slidably move to the left and right relative to the graduated member 4'. The left and right displacement of the support table is controlled by a grip 13 having a pinion 12 meshing with a rack 11 fixed on the base plate 6.

The support table 10 is provided with a support 14. A screw rod 18 of a table 17 supporting a chin rest 16 is threadedly fitted to an adjust ring 15 rotatably connected to said support. A forward end of a set screw 19 screwed into the support 14 is protruded into a vertical slot 20 provided on the screw rod 18. The table 17 is provided with a support 22 having a forehead rest 21.

Thus, by rotating the adjust ring 15, the table 17 is moved up and down without being rotated, that is, the chin rest 16 and the forehead rest 21 are moved upwardly and downwardly so that the height of the eyes can be adjusted.

By rotating the grip 13, the support table 10 is displaced to left and right, whereby the left and right positions of the eyes relative to the graduated surface 4 can be controlled. By rotation of the grip 9, the base plate 6 can be moved forwardly and rearwardly to control the distance between the graduated surface 4 and the eyes.

A hole 4" is provided in the center of the scale member 4'. The eyeball fixation device 23 consisting of two cylinders 24 and 25 which are supported through supports 26 and 27 on a supporting plate 29 at the top and of the support 2 and relatively move to adjust an angle formed in a V-shape therebetween. Said hole 4" forms the common opening for the two cylinders. The cylinders 24 and 25 are preferably formed with a hollow portion in a truncated conical shape according to the principle of the above mentioned Patent. The cylinders 24 and 25 respectively on the supports 26 and 27, are pivotably mounted by a pin 30 on the support member 3. The other ends of the supports 26 and 27 are respectively provided with ball joints 31 and 32. A screw 34 having a knob 33 is threaded into a female screw formed on the ball joint. The screw 34 is provided with two threaded portions inversely threaded to each other. By revolving the knob 33, the supports 26 and 27 can be opened or closed about the pin 30 to each other. That is, the cylinders 24 and 25 are swung about a point corresponding to the pin 30 whereby the angle made by the cylinders 24, 25 is adjusted. The cylinders 24 and 25 have respectively openings at small diameter ends of the hollow parts which are united in one hole, which hole may preferably be in agreement with the hole 4" of the scale member 4'.

Upon measuring the two eye visual field by use of the present apparatus, first the distance 2d between the central points is measured, from the value of which the angle $\theta$ is calculated to thereby set up an angular positions of the cylinders 24 and 25 by the scale 36 provided on the support plate 29. Next, the chin of the person to be inspected is placed on the chin-rest 16, with the face fixed at the table 17, and position of the eyes in height and front, rear, left and right directions are adjusted by movement of each grip so as to set up a position to exactly see through the truncated conical hollow portions of the cylinders 24 and 25.

After setting up the positions of eyes, the auxiliary graduated plate 5 is rotated to measure a visual field in a predetermined angle.

According to the present invention, it became possible to measure the two eye visual field simply, rapidly and accurately.

The embodiment has shown a very simple construction, and it is of course possible to use more precise and superior adjusting mechanism for position adjusting means and the like.

I claim:

1. A two-eye compimeter device comprision in combination: a horopter sphere element having a concave face; human-head stabilizing means for stabilizing a person's head in a predetermined position and for aligning a person's two eyes in a position equidistantly from and in front of said concave face along an imaginary perpendicular bisector of the two eyes perpendicular to said face such that the perpendicular bisects the distance between said two eyes; a predetermined common point of fixation means provided on said face and on said perpendicular bisector visible to both eyes and to which lines of vision of both eyes are simultaneously passable when the two eyes are bisected in equal distances on opposite sides of said perpendicular bisector; preset and calibrated measuring linear means perpendicularly positioned relative to said imaginary perpendicular; and angle means for determining where lines of vision from both eyes each respectively pass through said common point of fixation means and each respectively cross said linear means transversly thereof at equal angles to one-another as each line of vision is crossable of the linear means.

2. A two-eye compimeter device of claim 1, in which said common point of fixation means includes a through-perforation in said face, and in which said angle means are separate conduits of linear shape each separately pivotably hinged and aligned to and with said common point of fixation means, and the opposite end of each conduit being free for simultaneous regulated identical but opposite movement toward and away from each other and both said conduits transversing said linear means.

3. A two-eye compimeter device of claim 2, in which the head stabilizing means includes a mechanism for varying head position in elevation, laterally, and forwardly and backwardly relative to said common point and for alignment on said perpendicular bisector.

* * * * *